(12) United States Patent
Ha et al.

(10) Patent No.: US 8,716,414 B2
(45) Date of Patent: May 6, 2014

(54) MIXED METALLOCENE CATALYST COMPOSITION AND METHOD FOR PREPARING POLYOLEFIN USING THE SAME

(75) Inventors: Jong-Joo Ha, Daejeon (KR); Choong-Hoon Lee, Daejeon (KR); Don-Ho Kum, Daejeon (KR); Eun-Jung Lee, Daejeon (KR); Beom-Doo Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 33 days.

(21) Appl. No.: 13/508,297

(22) PCT Filed: Nov. 5, 2010

(86) PCT No.: PCT/KR2010/007803
§ 371 (c)(1),
(2), (4) Date: Jun. 22, 2012

(87) PCT Pub. No.: WO2011/056020
PCT Pub. Date: May 12, 2011

(65) Prior Publication Data
US 2012/0259077 A1   Oct. 11, 2012

(30) Foreign Application Priority Data

Nov. 6, 2009  (KR) .................. 10-2009-0107033
Sep. 16, 2010  (KR) .................. 10-2010-0091085

(51) Int. Cl.
| C08F 4/6592 | (2006.01) |
| C08F 4/653 | (2006.01) |
| C08F 4/655 | (2006.01) |
| C08F 210/02 | (2006.01) |

(52) U.S. Cl.
USPC ............ 526/113; 526/114; 526/134; 526/160; 526/161; 526/348; 526/943; 502/113; 502/152

(58) Field of Classification Search
USPC ......... 526/113, 114, 134, 160, 161, 348, 943; 502/113, 152
See application file for complete search history.

(56) References Cited

U.S. PATENT DOCUMENTS

| 5,672,666 | A | 9/1997 | Muhle et al. |
| 6,399,531 | B1 | 6/2002 | Job et al. |
| 6,399,723 | B1 | 6/2002 | Burkhardt et al. |
| 6,444,605 | B1 | 9/2002 | Job et al. |
| 7,250,473 | B2 | 7/2007 | Schramm et al. |
| 7,345,113 | B2 | 3/2008 | Van Dun et al. |

FOREIGN PATENT DOCUMENTS

| CN | 1697843 | 11/2005 |
| JP | 08-100018 | 4/1996 |
| JP | 2006-509904 | 3/2006 |
| JP | 2008-527050 | 7/2008 |
| KR | 1020000042620 A | 7/2000 |
| KR | 101999022334 A | 2/2004 |
| KR | 1020040085650 A | 10/2004 |
| KR | 1020060087890 A | 8/2006 |
| KR | 1020070096465 A | 10/2007 |
| KR | 1020090063799 A | 6/2009 |
| WO | 2008/084931 | 7/2008 |
| WO | 2008/100064 | 8/2008 |
| WO | WO 2008/136621 | 11/2008 |

*Primary Examiner* — Caixia Lu
(74) *Attorney, Agent, or Firm* — McKenna Long & Aldridge, LLP (57) ABSTRACT

The present invention relates to a mixed metallocene catalyst composition including a first metallocene catalyst and a second metallocene catalyst, and a method for preparing a polyolefin using the catalyst composition. According to the catalyst composition and the preparation method, provided is a polyolefin having a wide molecular weight distribution and superior mechanical properties and processability.

8 Claims, 3 Drawing Sheets

MIXED METALLOCENE CATALYST COMPOSITION AND METHOD FOR PREPARING POLYOLEFIN USING THE SAME

This application is a National Stage Entry of International Application No. PCT/KR2010/007803, filed Nov. 5, 2010, and claims the benefit of Korean Application Nos. 10-2009-0107033, filed on Nov. 6, 2009 and 10-2010-0091085, filed Sep. 16, 2010, which are hereby incorporated by reference for all purposes as if fully set forth herein.

TECHNICAL FIELD

The present invention relates to a mixed metallocene catalyst composition and a method for preparing a polyolefin using the same, and more particularly, to a mixed metallocene catalyst composition capable of providing a polyolefin having a wide molecular weight distribution and superior mechanical properties and processability, and a method for preparing a polyolefin using the same.

BACKGROUND OF THE INVENTION

A Ziegler-Natta catalyst that is widely used in commercial processes is a multi-site catalyst, and thus produces polymers with a broad molecular weight distribution and an uneven comonomer distribution. Therefore, it is difficult to obtain desired physical properties.

On the contrary, a metallocene catalyst is a single-site catalyst having only a single kind of active site, and thus produces polymers with a narrow molecular weight distribution. Also, according to structures of the catalyst and ligand, molecular weight, tacticity, crystallinity, and in particular, comonomer reactivity, can be greatly controlled. However, a polyolefin polymerized using the metallocene catalyst has inferior workability due to a narrow molecular weight distribution, and in particular, has significantly lowered producibility when applied to some products due to the effects of extrusion load. Thus, there have been many efforts to control the molecular weight distribution of polyolefins.

For example, U.S. Pat. Nos. 4,461,873 and 7,250,473 suggest that polyolefins having different molecular weights and comonomer contents are physically mixed to control the molecular weight distribution. In addition, U.S. Pat. No. 7,345,113 suggests that the molecular weight distribution is controlled by varying polymerization conditions in each reactor of a multiple reactor system. The former method is problematic in that the physical mixing requires additional production costs, and a large amount of gel is contained due to compatibility of the two polymers to reduce physical properties. The latter method is also problematic in that the process is complicated, there is a limitation in broadening the molecular weight distribution because of limited hydrogen reactivity of the catalyst, and the polymerization conditions are also complicated.

Another known method for preparing a polyolefin having a wide molecular weight distribution is to use a Ziegler-Natta mixed catalyst, but this method also has a problem of requiring two or more reactors.

In addition, U.S. Pat. Nos. 6,444,605, 6,399,531, and 6,399,723, and Korean Patent Publication Nos. 1999-022334 and 2000-0042620, disclose that two different catalysts are blended in a single reactor to perform polymerization or two or more catalysts supported by a single support are used to perform polymerization. However, most of them mention a catalyst mixture including a metallocene compound and a Ziegler Natta-based titanium metal compound supported by a single support.

Therefore, there is a need to develop a method for preparing a metallocene catalyst capable of providing a polyolefin having a wide molecular weight distribution for the improvement of mechanical properties and processability.

DETAILED DESCRIPTION OF THE INVENTION

Technical Objectives

The present invention provides a mixed metallocene catalyst composition capable of providing a polyolefin having a wide molecular weight distribution and superior mechanical properties and processability.

Further, the present invention provides a method for preparing a polyolefin using the mixed metallocene catalyst composition.

Technical Solution

The present invention provides a mixed metallocene catalyst composition including a particular first metallocene catalyst and second metallocene catalyst.

Further, the present invention provides a method for preparing a polyolefin, including the step of polymerizing olefin monomers in the presence of the mixed metallocene catalyst composition.

Hereinafter, the mixed metallocene catalyst composition and the method for preparing a polyolefin using the same according to specific embodiments of the present invention will be described in detail.

According to one embodiment of the present invention, there is provided a mixed metallocene catalyst composition, including a first metallocene catalyst including a compound of the following Formula 1, and a second metallocene catalyst including one or more selected from the group consisting of compounds of the following Formulae 2 to 4.

[Formula 1]

Herein: R1 and R2 may be the same as or different from each other, and are each independently hydrogen, an alkyl having 1 to 20 carbon atoms, an alkenyl having 2 to 20 carbon atoms, an aryl having 6 to 20 carbon atoms, a silyl, an alkylaryl having 7 to 20 carbon atoms, an arylalkyl having 7 to 20 carbon atoms, or a metalloid of a Group 4 metal substituted with a hydrocarbyl; and R1 and R2 or two R2s may be connected to each other by an alkylidene containing an alkyl having 1 to 20 carbon atoms or an aryl having 6 to 20 carbon atoms to form a ring.

Further, R3, R3', and R3" may be the same as or different from each other, and are each independently hydrogen, a halogen, an alkyl having 1 to 20 carbon atoms, an alkenyl having 2 to 20 carbon atoms, an aryl having 6 to 20 carbon atoms, an alkylaryl having 7 to 20 carbon atoms, an arylalkyl having 7 to 20 carbon atoms, an alkoxy having 1 to 20 carbon atoms, an aryloxy having 6 to 20 carbon atoms, or a substituted or unsubstituted amino group, and two or more of R3, R3', and R3" may be connected to each other to form an aliphatic or aromatic ring.

Further, CY1 may be a substituted or unsubstituted aliphatic or aromatic ring, in which CY1 may be substituted with a halogen, an alkyl having 1 to 20 carbon atoms, an alkenyl having 2 to 20 carbon atoms, an aryl having 6 to 20 carbon atoms, an alkylaryl having 7 to 20 carbon atoms, an arylalkyl having 7 to 20 carbon atoms, an alkoxy having 1 to 20 carbon atoms, an aryloxy having 6 to 20 carbon atoms, or a substituted or unsubstituted amino group, and if CY1 is substituted with multiple substituents, two or more of the substituents may be connected to each other to form an aliphatic or aromatic ring.

M may be a Group 4 transition metal; Q1 and Q2 may be the same as or different from each other, and are each independently a halogen, an alkyl having 1 to 20 carbon atoms, an alkenyl having 2 to 20 carbon atoms, an aryl having 6 to 20 carbon atoms, an alkylaryl having 7 to 20 carbon atoms, an arylalkyl having 7 to 20 carbon atoms, a substituted or unsubstituted amino group, or an alkylidene having 1 to 20 carbon atoms.

[Formula 2]

Herein: M2 may be a Group 4 transition metal; Cp and Cp' may be the same as or different from each other, and are each independently any one functional group selected from the group consisting of a cyclopentadienyl, an indenyl, 4,5,6,7-tetrahydro-1-indenyl, and a fluorenyl, and they may be substituted with a hydrocarbon having 1 to 20 carbon atoms; R4 and R5 may be the same as or different from each other, and are each independently hydrogen, an alkyl having 1 to 20 carbon atoms, an alkoxy having 1 to 10 carbon atoms, an aryl having 6 to 20 carbon atoms, an aryloxy having 6 to 10 carbon atoms, an alkenyl having 2 to 20 carbon atoms, an alkylaryl having 7 to 40 carbon atoms, an arylalkyl having 7 to 40 carbon atoms, an arylalkenyl having 8 to 40 carbon atoms, or an alkynyl having 2 to 10 carbon atoms; Q3 may be a halogen, an alkyl having 1 to 20 carbon atoms, an alkenyl having 2 to 10 carbon atoms, an alkylaryl having 7 to 40 carbon atoms, an arylalkyl having 7 to 40 carbon atoms, an aryl having 6 to 20 carbon atoms, a substituted or unsubstituted alkylidene having 1 to 20 carbon atoms, a substituted or unsubstituted amino group, an alkylalkoxy having 2 to 20 carbon atoms, or an arylalkoxy having 7 to 40 carbon atoms; and n may be 1 or 0.

[Formula 3]

Herein: M3 may be a Group 4 transition metal; R5 and R6 may be the same as or different from each other, and are each independently hydrogen, an alkyl having 1 to 20 carbon atoms, an alkenyl having 2 to 20 carbon atoms, an aryl having 6 to 20 carbon atoms, an alkylaryl having 7 to 40 carbon atoms, an arylalkyl having 7 to 40 carbon atoms, a silyl, a methoxymethyl, a t-butoxymethyl, a tetrahydropyranyl, a tetrahydrofuranyl, a 1-ethoxyethyl, a 1-methyl-1-methoxyethyl, or a t-butyl; A may be any one selected from the group consisting of an alkylene having 2 to 4 carbon atoms, an alkyl silicon or germanium having 1 to 4 carbon atoms, and an alkyl phosphine or amine having 1 to 4 carbon atoms; Q4 and Q5 may be the same as or different from each other, and are each independently a halogen, an alkyl having 1 to 20 carbon atoms, an alkenyl having 2 to 10 carbon atoms, an alkylaryl having 7 to 40 carbon atoms, an arylalkyl having 7 to 40 carbon atoms, an aryl having 6 to 20 carbon atoms, a substituted or unsubstituted alkylidene having 1 to 20 carbon atoms, a substituted or unsubstituted amino group, an alkylalkoxy having 2 to 20 carbon atoms, or an arylalkoxy having 7 to 40 carbon atoms, and m may be an integer of 0 to 10.

[Formula 4]

Herein: M4 may be a Group 4 transition metal; R7 and R8 may be the same as or different from each other, and are each independently an alkyl having 1 to 20 carbon atoms, an alkenyl having 2 to 20 carbon atoms, a cycloalkyl having 3 to 30 carbon atoms, an aryl having 6 to 30 carbon atoms, an alkylaryl having 7 to 30 carbon atoms, an arylalkyl having 7 to 30 carbon atoms, or an arylalkenyl having 8 to 30 carbon atoms; Q6 and Q7 may be the same as or different from each other, and are each independently a halogen, an alkyl having 1 to 20 carbon atoms, an alkenyl having 2 to 20 carbon atoms, an aryl having 6 to 30 carbon atoms, an alkylaryl having 7 to 30 carbon atoms, or an arylalkyl having 7 to 30 carbon atoms, and Q6 and Q7 may be connected to each other to form a hydrocarbon ring having 1 to 20 carbon atoms; B may be an alkylene having 1 to 4 carbon atoms, a dialkyl silicon, germanium, an alkyl phosphine, or an amine, and may act as a bridge between two cyclopentadienyl ligands by a covalent bond.

Further, a and a' may be the same as or different from each other, and are each independently a positive integer of 0 or more; o may be an integer of 0 to 2 and p may be an integer of 0 to 3; Y may be a heteroatom of oxygen (O), sulfur (S), nitrogen (N), or phosphorus (P); and C may be hydrogen or an alkyl having 1 to 10 carbon atoms.

The term "hydrocarbyl" means a monovalent moiety obtained upon removal of a hydrogen atom from a hydrocarbon, and may include an ethyl, a phenyl, or the like. The term "metalloid" means a semi-metal having properties of both a metal and a non-metal, and includes arsenic, boron, silicon, tellurium, or the like.

A detailed description of each substituent in the above Formula is as follows.

The alkyl group having 1 to 20 carbon atoms may include a straight or branched chain alkyl group, and the alkenyl having 2 to 20 carbon atoms may include a straight or branched chain alkenyl group.

The silyl group may include silyl functional groups that are introduced with an alkyl having 1 to 20 carbon atoms, an aryl having 6 to 20 carbon atoms, an alkoxy having 1 to 10 carbon atoms, or an alkylsilyl having 1 to 20 carbon atoms, and specific examples thereof may include trimethylsilyl, triethylsilyl, tripropylsilyl, tributylsilyl, trihexylsilyl, triisopropylsilyl, triisobutylsilyl, triethoxysilyl, triphenylsilyl, and tris(trimethylsilyl)silyl, but are not limited thereto.

The aryl group may be preferably an aromatic ring having 6 to 20 carbon atoms, and specific examples may include phenyl, naphthyl, anthracenyl, pyridyl, dimethylanilinyl, and anisolyl, but are not limited thereto.

The alkylaryl group means an aryl group that is introduced with one or more straight or branched chain alkyl groups having 1 to 20 carbon atoms, and the arylalkyl group means a straight or branched chain alkyl group that is introduced with one or more aryl groups having 6 to 20 carbon atoms.

The substituted amino group means an alkyl amino group that is introduced with one or more straight or branched chain alkyl groups having 1 to 20 carbon atoms, or an aryl amino group that is introduced with one or more aryl groups having 6 to 20 carbon atoms.

The aryloxy group means an aryl functional group introduced with an oxygen atom, that is, a functional group represented by "—O—Ar".

The present inventors demonstrated that polymerization of olefin monomers is performed using the mixed metallocene catalyst composition including the first metallocene catalyst of Formula 1 that is capable of synthesizing a low-density polyolefin and the second metallocene catalyst of Formula 2, 3, or 4 that is capable of synthesizing a high-density polyolefin so as to obtain a low-density polyolefin having a wide molecular weight distribution, the properties of a high-density polyolefin, and superior mechanical properties and processability, thereby completing the present invention.

In particular, the metallocene catalysts for synthesizing high-density polyolefins are not generally used in a high temperature solution polymerization process because of its low activity at a high temperature. However, when the second metallocene catalyst of Formula 2, 3, or 4 is mixed with the first metallocene catalyst of Formula 1, it shows excellent catalytic activity even at a high temperature of 130° C. or higher. Therefore, when the mixed metallocene catalyst composition including the first metallocene catalyst and the second metallocene catalyst is used, the catalyst has two or more active sites so as to broaden the molecular weight distribution of the prepared polyolefin. Moreover, the polyolefin prepared by using the mixed metallocene catalyst has the properties of a high-density polyolefin to show superior mechanical properties and processability even though it has low density.

Further, the polyolefin prepared by using the mixed metallocene catalyst composition has the intrinsic properties of low-density polyolefins, and thus it is distinguished from the previous polyolefins that have a bimodal or multimodal molecular weight distribution to show mixed properties of high- and low-density polyolefins.

The first metallocene catalyst including the compound of Formula 1 can be used to synthesize a polyolefin having a density of 0.920 g/cc or less. A specific example of the first metallocene catalyst may be a compound of the following Formula 5 or 6.

[Formula 5]

Herein, R1, R2, Q1, Q2, and M1 may be the same as in Formula 1, and R11s may be the same as or different from each other, and are each independently hydrogen, a halogen, an alkyl having 1 to 20 carbon atoms, an alkenyl having 2 to 20 carbon atoms, an aryl having 6 to 20 carbon atoms, an alkylaryl having 7 to 20 carbon atoms, an arylalkyl having 7 to 20 carbon atoms, an alkoxy having 1 to 20 carbon atoms, an aryloxy having 6 to 20 carbon atoms, or a substituted or unsubstituted amino group, and two or more of R11s may be connected to each other to form an aliphatic or aromatic ring.

[Formula 6]

Herein, R1, R2, Q1, Q2, and M1 may be the same as in Formula 1, and R12s may be the same as or different from each other, and are each independently hydrogen, a halogen, an alkyl having 1 to 20 carbon atoms, an alkenyl having 2 to 20 carbon atoms, an aryl having 6 to 20 carbon atoms, an alkylaryl having 7 to 20 carbon atoms, an arylalkyl having 7 to 20 carbon atoms, an alkoxy having 1 to 20 carbon atoms, an aryloxy having 6 to 20 carbon atoms, or a substituted or unsubstituted amino group, and two or more of R12s may be connected to each other to form an aliphatic or aromatic ring.

In the compound of Formula 1, the specific examples of the preferred compound for tuning the electronic and steric environment around the metal are as follows. In the following formulae, R2s may each be independently hydrogen or a methyl group, and Q1 or Q2 are the same as or different from each other, and are each independently a methyl group, a dimethylamino group, or a chloride group.

The second metallocene catalyst including one or more selected from the group consisting of the compounds of Formulae 2 to 4 can be used to synthesize a polyolefin having a density of more than 0.920 g/cc. Preferably, the second metallocene catalyst may be the compound of Formula 2.

A specific example of the compound of Formula 2 may be a compound of the following Formula 7, and a specific example of the compound of Formula 3 may be a compound of the following Formula 8.

[Formula 7]

[Formula 8]

Meanwhile, the mixed metallocene catalyst composition may include the first metallocene catalyst and the second metallocene catalyst in a proper ratio, considering the physical properties and density of the polyolefin to be prepared. However, in order to obtain a low-density polyolefin having a wide molecular weight distribution, properties of high-density polyolefin, and superior mechanical properties and processability, the mixed metallocene catalyst composition includes the first metallocene catalyst at 80 mol % or more~less than 100 mol %, preferably 90 mol % or more~less than 100 mol %; and the second metallocene catalyst of more than 0 mol %~20 mol % or less, preferably more than 0 mol %~10 mol % or less.

Meanwhile, the mixed metallocene catalyst composition may further include one kind of cocatalyst. The metallocene catalysts generate different active species depending on the catalyst, and thus cocatalysts may vary according to the properties of the catalyst. However, even though the mixed metallocene catalyst composition includes two or more metallocene catalysts, only one kind of cocatalyst is used to increase the catalytic activity and to have two or more catalytic active sites.

A preferred example of one kind of the cocatalyst included in the mixed metallocene catalyst composition may be a compound of the following Formula 9.

$[L-H]^+[Z(E)_4]^-$ [Formula 9]

Herein, L may be a neutral Lewis base, $[L-H]^+$ may be a Bronsted acid, Z may be boron or aluminum in the +3 oxidation state, and Es may each independently be an aryl having 6 to 20 carbon atoms or an alkyl having 1 to 20 carbon atoms, in which one or more hydrogen atoms thereof are unsubstituted or substituted with a halogen, an hydrocarbyl having 1 to 20 carbon atoms, an alkoxy functional group, or a phenoxy functional group.

The compound of Formula 9 includes a non-coordinating anion compatible with the Bronsted acid. Preferred anions are those containing a single coordination complex having a large size, and a semi-metal. In particular, compounds containing a single boron atom in the anion portion are widely used. In this regard, preferred are salts containing anions including a coordination complex containing a single boron atom.

Meanwhile, in the mixed metallocene catalyst composition, the mole ratio of the first metallocene catalyst and the second metallocene catalyst to the cocatalyst may be 1:1 to 1:10, and preferably 1:10 to 1:4. If the mole ratio is less than 1:1, the amount of cocatalyst is relatively small and the metal compound is not fully activated such that the activity of the mixed metallocene catalyst is not sufficient. If the mole ratio is more than 1:1, the activity of the mixed metallocene catalyst can be increased, but an excessive amount of cocatalyst is used to greatly increase the production costs.

As specific examples of the compound of Formula 9, examples of trialkylammonium salts may include trimethylammonium tetrakis(pentafluorophenyl)borate, triethylammonium tetrakis(pentafluorophenyl)borate, tripropylammonium tetrakis(pentafluorophenyl)borate, tri(n-butyl) ammonium tetrakis(pentafluorophenyl)borate, tri(2-butyl) ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl) ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis(pentafluorophenyl)borate, dodecyldimethylammonium tetrakis(pentafluorophenyl)borate, tetradecyldimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammonium tetrakis(pentafluorophenyl)borate, methyldidodecylammonium tetrakis(pentafluorophenyl)borate, methylditetradecylammonium tetrakis(pentafluorophenyl)borate, methyldihexadecylammonium tetrakis(pentafluorophenyl)borate, methyldioctadecylammonium tetrakis(pentafluorophenyl)borate, methyldieicosylammonium tetrakis(pentafluorophenyl)borate, tridecylammonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, octadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, and methyldi(dodecyl) ammonium tetrakis(pentafluorophenyl)borate.

Further, examples of dialkylammonium salts may include di-(i-propyl)ammonium tetrakis(pentafluorophenyl)borate, and dicyclohexylammonium tetrakis(pentafluorophenyl)borate.

Further, examples of carbonium salts may include tropylium tetrakis(pentafluorophenyl)borate, triphenylmethylium tetrakis(pentafluorophenyl)borate, and benzene(diazonium) tetrakis(pentafluorophenyl)borate.

In particular, preferred examples of the compound of Formula 9 may include N,N-dimethylanilinium tetrakis(pentafluorophenyl)borate, tributylammonium tetrakis(pentafluorophenyl)borate, di(octadecyl)methylammonium tetrakis(pentafluorophenyl)borate, di(octadecyl)(n-butyl) ammonium tetrakis(pentafluorophenyl)borate, triphenylmethylium tetrakis(pentafluorophenyl)borate, and tropylium tetrakis(pentafluorophenyl)borate.

Meanwhile, the mixed metallocene catalyst composition may further include a scavenger capable of removing impurities that may act as a poison to the catalyst.

In the mixed metallocene catalyst composition, the mole ratio of the first metallocene catalyst and the second metallocene catalyst to the scavenger may be 1:1 to 1:1000, preferably 1:5 to 1:250, and more preferably 1:5 to 1:200. If the mole ratio is less than 1:1, satisfactory effects cannot be obtained by addition of the scavenger. If the mole ratio is more than 1:1000, excessive amounts of unreacted residual alkyl groups inhibit the catalytic reaction and act as a catalyst poison. Consequently, a side reaction occurs, and an excessive amount of aluminum or boron remains in the polymer.

Preferred examples of the scavenger may include a compound of the following Formula 10 or 11, and a mixture thereof.

D(R9)$_3$ [Formula 10]

Herein, D may be aluminum or boron, and R9 may be a hydrocarbyl having 1 to 20 carbon atoms, or a halogen-substituted hydrocarbyl having 1 to 20 carbon atoms.

[Formula 11]

Herein, R10 may be a halogen, a hydrocarbyl having 1 to 20 carbon atoms, or a halogen-substituted hydrocarbyl having 1 to 20 carbon atoms, and a may be an integer of 2 or more.

Specific examples of the compound of Formula 10 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferably, trimethylaluminum, triethylaluminum, or triisobutylaluminum may be used.

Specific examples of the compound of Formula 11 may include methylaluminoxane, ethylaluminoxane, isobutylaluminoxane, and butylaluminoxane, and preferably methylaluminoxane.

Meanwhile, according to another embodiment of the present invention, provided is a method for preparing a polyolefin, including the step of polymerizing olefin monomers in the presence of the mixed metallocene catalyst composition.

As described above, it was found that polymerization of olefin monomers is performed using the mixed metallocene catalyst composition including the first metallocene catalyst of Formula 1 and the second metallocene catalyst of Formula 2, 3, or 4 that are capable of synthesizing a high-density polyolefin, thereby obtaining a low-density polyolefin having a wide molecular weight distribution, the properties of a high-density polyolefin, and superior mechanical properties and processability. In particular, the prepared polyolefin shows the properties of a high-density polyolefin even though it has low density, and thus exhibits superior mechanical properties and processability. Therefore, the prepared polyolefin is distinguished from the previous polyolefins that have a bimodal or multimodal molecular weight distribution to show mixed properties of high- and low-density polyolefins.

Meanwhile, the conventional metallocene catalysts for synthesizing high-density polyolefins are not generally used in a high temperature solution polymerization process because of its low activity at a high temperature. However, when the second metallocene catalyst of Formula 2, 3, or 4 is mixed with the first metallocene catalyst of Formula 1, it shows excellent catalytic activity even at a high temperature. Therefore, when the mixed metallocene catalyst composition including the first metallocene catalyst and the second metallocene catalyst is used, the catalyst has two or more active sites so as to broaden the molecular weight distribution of the prepared polyolefin. Moreover, the polyolefin prepared by using the mixed metallocene catalyst has the properties of a high-density polyolefin to show superior mechanical properties and processability even though it has low density.

Therefore, the polymerization of olefin monomers may be performed at 130 to 250° C., and preferably 140 to 200° C. As described above, the second metallocene catalyst maintains its activity at a high temperature of 130° C. or higher when mixed with the first metallocene catalyst. Thus, the catalyst has two or more active sites during the polymerization reaction of the polyolefin.

In addition, the polymerization reaction of olefin monomers may be performed by continuous solution polymerization, bulk polymerization, suspension polymerization, or emulsion polymerization, and preferably solution polymerization, in a single reactor. In the method for preparing a polyolefin, a polyolefin can be synthesized in a single reactor even though two different metallocene catalysts are used. Thus, the production process is simple, thereby reducing time and cost required for the production process.

In the preparation of the polyolefin, any known apparatus, equipment, synthetic method, and reaction conditions that are typically employed in the preparation of polyolefins using a metallocene catalyst may be used without limitation, in addition to the above description.

Specific examples of the olefin monomers used in the preparation of polyolefin may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, and mixtures thereof.

Meanwhile, in the polymerization reaction of olefin monomers, the density of the prepared polyolefin can be adjusted by controlling the content of the second metallocene catalyst. In particular, a relatively small amount of the second metallocene catalyst is included in the mixed metallocene catalyst, thereby providing a polyolefin that has a wide molecular weight distribution and shows no bimodal or multimodal molecular weight distribution. That is, the second metallocene catalyst is used in an amount of more than 0~20 mol % or less, and preferably more than 0~10 mol % or less, based on the total weight of the mixed metallocene catalyst, so that the prepared polyolefin is controlled to have a density of 0.920 g/cc or less, and preferably 0.850 to 0.915 g/cc.

MFRR (melt flow rate ratio) of the polyolefin prepared by the above polyolefin preparation method may satisfy the following Equation 1.

[MFRR (mixed metallocene catalyst)−MFRR (first metallocene catalyst)]/(mole ratio of second metallocene catalyst to mixed metallocene catalyst)>0.1 [Equation 1]

Herein, MFRR means MI10/MI2 as a ratio of melt index (MI) of a polyolefin measurable according to ASTM D-1238, MFRR (mixed metallocene catalyst) is MFRR of a polyolefin prepared by using the mixed metallocene catalyst composition, MFRR (first metallocene catalyst) is MFRR of a polyolefin prepared by using the first metallocene catalyst alone, MI10 means a melt index measured at 190° C. under a load of 10 kg, and MI2 means a melt index measured at 190° C. under a load of 2.16 kg.

As the MI10/MI2 value is increased, processability of a polymer resin may be increased. As the mole ratio of the second metallocene catalyst is increased, the MFRR value of the mixed metallocene catalyst may be increased, which means that the prepared polyolefin has a wide molecular weight distribution and improved processability.

In particular, if the amount of the second metallocene catalyst is controlled at a predetermined level, that is, satisfying Equation 1, a polyolefin having superior mechanical properties and processability can be obtained. As described above, the second metallocene catalyst may be used in an amount of more than 0~20 mol % or less, and preferably more than 0~10 mol % or less, based on the total weight of the mixed metallocene catalyst.

Advantageous Effects

The present invention provides a mixed metallocene catalyst composition capable of providing a polyolefin having a wide molecular weight distribution and superior mechanical properties and processability, and a method for preparing a polyolefin using the same.

DETAILED EMBODIMENTS OF THE INVENTION

Hereinafter, the present invention will be described in more detail with reference to the following examples. However, these examples are for illustrative purposes only and are not intended to limit the scope of the invention.

Examples and Comparative Examples

Preparation of Polyolefin

Examples 1~10

A hexane solvent and 1-octene and ethylene monomers were supplied into a 1.5 L continuous stirred reactor preheated to 100~150° C. at a pressure of 89 bar. A first metallocene catalyst (LGC-001, LG Chemical), a second metallocene catalyst (K, LG Chemical), a first cocatalyst of dimethylanilinium tetrakis(pentafluorophenyl)borate, and a second cocatalyst of triisobutylaluminum were supplied from a catalyst storage tank to the reactor to perform a copolymerization reaction. The polymerization was performed at a relatively high temperature of 140~180° C., and the polymer solution formed by the copolymerization reaction was supplied into a solvent separator to mostly remove the solvent. The resultant was passed through cooling water and a cutter to give particulate polymers.

Comparative Examples 1 to 3

Polyolefins were prepared in the same manner as in Example 1, except that the second metallocene catalyst was not used.

Polymerization conditions of ethylene/1-octene copolymers according to examples and comparative examples are shown in the following Table 1.

TABLE 1

Polymerization Conditions of Examples and Comparative Examples

| | Mixed catalyst (umol/min) | | | | | | | |
|---|---|---|---|---|---|---|---|---|
| | First metallocene catalyst | Second metallocene catalyst | Cocatalyst (umol/min) | Scavenger (umol/min) | Ethylene (Kg/h) | 1-Octene (Kg/h) | Hydrogen (L/h) | Polymerization temperature (° C.) |
| Example 1 | 0.485 | 0.015 | 1.50 | 35 | 0.80 | 0.32 | 2.30 | 150-169 |
| Example 2 | 0.485 | 0.015 | 1.50 | 35 | 0.80 | 0.32 | 2.43 | 148-167 |
| Example 3 | 0.485 | 0.015 | 1.50 | 35 | 0.80 | 0.72 | 1.00 | 154-171 |
| Example 4 | 0.485 | 0.015 | 1.50 | 35 | 0.80 | 0.91 | 0.00 | 152-171 |
| Example 5 | 0.485 | 0.015 | 1.50 | 35 | 0.80 | 0.32 | 2.00 | 150-170 |
| Example 6 | 0.485 | 0.015 | 1.50 | 35 | 0.80 | 0.72 | 1.20 | 151-169 |
| Example 7 | 0.3868 | 0.0132 | 1.20 | 40 | 0.63 | 0.63 | 0 | 154-170 |
| Example 8 | 0.38 | 0.020 | 1.20 | 40 | 0.63 | 0.63 | 0 | 157-168 |
| Example 9 | 0.375 | 0.025 | 1.20 | 40 | 0.63 | 0.63 | 0 | 161-173 |
| Example 10 | 0.3556 | 0.0444 | 1.20 | 40 | 0.63 | 0.63 | 0 | 147-158 |
| Comparative Example 1 | 0.50 | 0 | 1.50 | 35 | 0.90 | 0.26 | 5.95 | 166-178 |
| Comparative Example 2 | 0.50 | 0 | 1.50 | 35 | 0.80 | 0.72 | 1.20 | 149-171 |
| Comparative Example 3 | 0.40 | 0 | 1.20 | 40 | 0.63 | 0.63 | 0 | 154-165 |

First metallocene catalyst: 1-(N-methyl-1,2,3,4-tetrahydroquinolin-8-yl)-2,3,4,5-tetramethylcyclopentadienyl dimethyl titanium (IV) (LGC-001, LG Chemical)
Second metallocene catalyst: [t-Butyl-O—(CH2)—C5H4]2Zr2Cl2 (K, LG Chemical)
Cocatalyst: dimethylanilinium tetrakis(pentafluorophenyl)borate
Scavenger: TIBAL (triisobutylaluminum)

As shown in Table 1, when polymerization of olefin monomers was performed at a high temperature of 130° C. or higher using the mixed metallocene catalyst including the first metallocene catalyst and the second metallocene catalyst, polyolefins having a wide molecular weight distribution were synthesized (see the following Table 3). That is, when the second metallocene catalyst of Formula 2, 3, or 4 is mixed with the first metallocene catalyst of Formula 1, it does not lose its catalytic activity even at a high temperature of 130° C. or higher and generates two or more active sites in the polymerization reaction.

EXPERIMENTAL EXAMPLES

Experimental Example 1

Measurement of Reaction Yield and Density of Polyolefin (1) Yield of the polyolefin prepared in the examples and comparative examples was determined by the weight of particles obtained for 10 minutes.

(2) Density of the polyolefin prepared in the examples and comparative examples was determined using a Mettler scale after preparing a sheet having a thickness of 3 mm and a diameter of 2 cm using a press mold at 180° C. and cooling it at 10° C./min.

Reaction yield and density of the polyolefin in the examples and comparative examples are shown in the following Table 2.

TABLE 2

Reaction Yield and Density of Polyolefin in Examples and Comparative Examples

|  | Yield (g/10 min) | Density (g/cc) |
| --- | --- | --- |
| Example 1 | 110.4 | 0.906 |
| Example 2 | 119.7 | 0.910 |
| Example 3 | 153.2 | 0.883 |
| Example 4 | 145.0 | 0.878 |
| Example 5 | 118.2 | 0.906 |
| Example 6 | 152.0 | 0.883 |
| Example 7 | 106.2 | 0.886 |
| Example 8 | 101.6 | 0.887 |
| Example 9 | 98.1 | 0.890 |
| Example 10 | 105.6 | 0.892 |
| Comparative Example 1 | 104.5 | 0.912 |
| Comparative Example 2 | 133.7 | 0.880 |
| Comparative Example 3 | 100.3 | 0.878 |

As shown in Table 2, when the examples and comparative examples reacted under similar reaction conditions were compared to each other, the polyolefins prepared in the examples were found to show higher yield and have lower density. Specifically, the polyolefin prepared in Example 6, which was reacted under the same conditions as in Comparative Example 2 except for using the mixed metallocene catalyst, showed higher reaction yield.

Experimental Example 2

Measurement of Molecular Weight and Molecular Weight Distribution

A number-average molecular weight (Mn) and a weight-average molecular weight (Mw) of the polyolefins prepared in Examples 5 to 10 and Comparative Examples 2 and 3 were measured using a high-temperature GPC (PL-GPC220) instrument, and a molecular weight distribution (MWD, Mw/Mn) was determined therefrom.

The molecular weight and molecular weight distribution of the polyolefins of Examples 5 to 10 and Comparative Examples 2 and 3 are shown in the following Table 3.

TABLE 3

Molecular Weight and Molecular Weight Distribution of Polyolefins of Examples 5 to 10 and Comparative Examples 2 and 3

|  | Mn | Mw | MWD (Mw/Mn) |
| --- | --- | --- | --- |
| Example 5 | 11,952 | 63,000 | 5.2712 |
| Example 6 | 13,716 | 54,000 | 4.456 |
| Example 7 | 20,100 | 87,200 | 4.34 |
| Example 8 | 18,900 | 86,300 | 4.57 |
| Example 9 | 16,100 | 77,500 | 4.81 |
| Example 10 | 15,400 | 79,600 | 5.17 |
| Comparative Example 2 | 27,794 | 63,550 | 2.2865 |
| Comparative Example 3 | 41,000 | 105,4000 | 2.57 |

As shown in Table 3, polyolefins prepared in the examples were found to have a relatively wide molecular weight distribution. Specifically, the polyolefin prepared in Example 6, which was reacted under the same conditions as in Comparative Example 2 except for using the mixed metallocene catalyst, was found to have a wide molecular weight distribution (e.g., almost a 2-fold increased MWD value), compared to the polyolefin prepared in Comparative Example 2.

Therefore, the polyolefins prepared in the examples have low density and wide molecular weight distribution, thereby showing the properties of a high-density polyolefin and superior mechanical properties and processability.

Experimental Example 3

Measurement of MFRR of Polyolefin

The melt index (MI) of the polyolefins prepared in Examples 7 to 10 and Comparative Example 3 was measured according to ASTM D-1238. The increased MFRR value [MFRR (mixed metallocene catalyst)−MFRR (first metallocene catalyst)] was determined, and Equation 1 was calculated therefrom.

TABLE 4

|  | MFRR (MI10/MI2) | Increased MFRR value | Value of Equation 1 |
| --- | --- | --- | --- |
| Example 7 | 9.5 | 1.7 | 0.52 |
| Example 8 | 9.9 | 2.1 | 0.42 |
| Example 9 | 10.2 | 2.4 | 0.39 |
| Example 10 | 10.3 | 2.5 | 0.23 |
| Comparative Example 3 | 7.8 | 0 | 0 |

As shown in Table 4, Examples 7 to 10 using the mixed metallocene catalyst showed higher increased MFRR values than Comparative Example 3 using the first metallocene catalyst alone. That is, a polyolefin having a wider molecular weight distribution and higher processability can be obtained in examples using the mixed metallocene catalyst.

Figure 1:
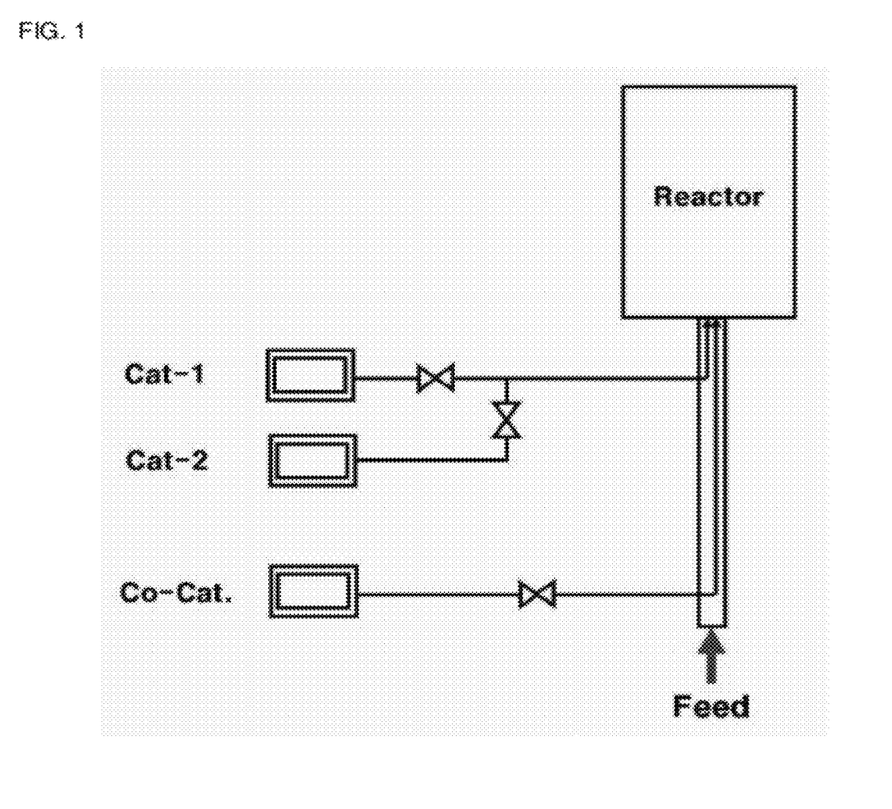
FIG. 1 is a schematic diagram showing a production process of olefin copolymers according to the present invention.
Figure 2:
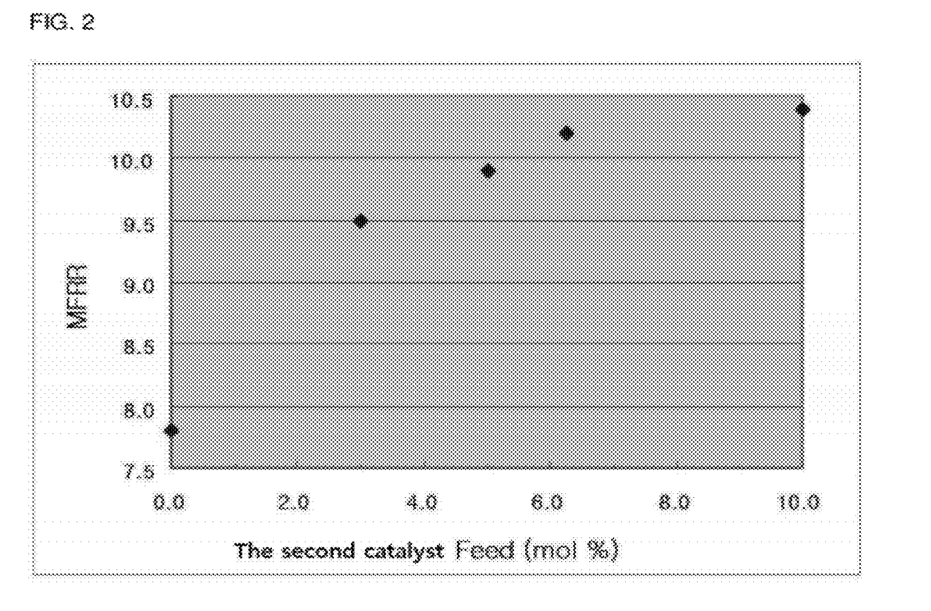
FIG. 2 shows MFRR analysis of olefin copolymers according to Examples 7~10 and Comparative Example 3 of the present invention.

As shown in the following FIG. 2, MFRR analysis results of olefin copolymers showed that MFRR was increased in proportion to the content of the second metallocene catalyst in the examples, which is attributed to the increased content of polyolefin produced by the second metallocene catalyst. Consequently, the prepared polyolefin has a wide molecular weight distribution and high processability. As shown in FIG. 2, however, when the content of the second metallocene catalyst reached a predetermined level, MFRR value was not further increased.

Figure 3:
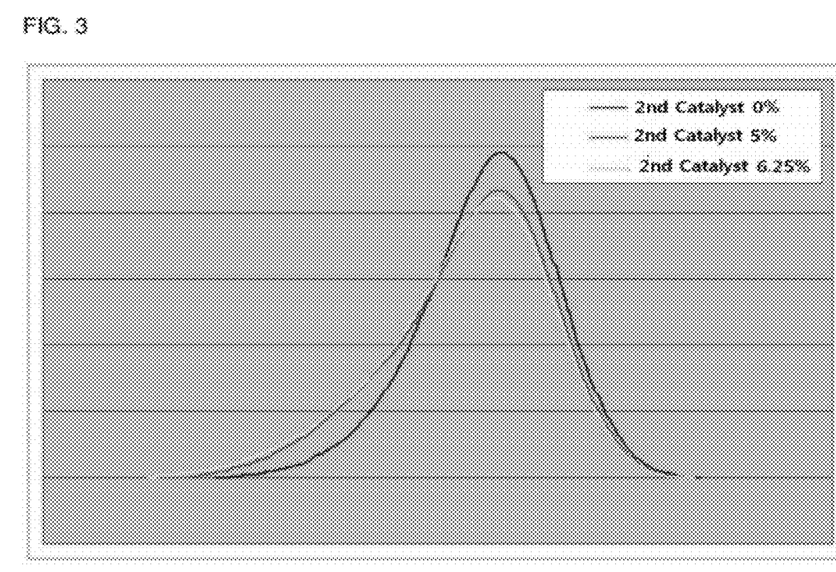
FIG. 3 shows GPC analysis of olefin copolymers according to Examples 8~9 and Comparative Example 3 of the present invention.

Further, as shown in FIG. 3, GPC analysis results of polyolefins showed that the prepared polyolefins had a wide molecular weight distribution even though a small amount of the second metallocene catalyst was supplied, which was in proportion to the MFRR values.

In light of the GPC analysis results of polyolefins in the following FIG. 3, however, a bimodal GPC curve may appear when the second metallocene catalyst exceeds a predetermined amount. In this case, polyolefins having proper mechanical properties and processability could not be prepared.

What is claimed is:

1. A method for preparing a polyolefin having a density of 0.850 to 0.915 g/cc, comprising a step of polymerizing olefin monomers at 130° C. to 200° C. in the presence of a mixed metallocene catalyst composition which comprises:
   a first metallocene catalyst including a compound of the following Formula 1 in an amount greater than or equal to 80 mol % and less than 100 mol %; and
   a second metallocene catalyst including one or more selected from the group consisting of compounds of the following Formulae 2 to 4 in an amount greater than 0 mol % and less than or equal to 20 mol %:

[Formula 1]

wherein R1 and R2 are each independently hydrogen, an alkyl having 1 to 20 carbon atoms, an alkenyl having 2 to 20 carbon atoms, an aryl having 6 to 20 carbon atoms, a silyl, an alkylaryl having 7 to 20 carbon atoms, an arylalkyl having 7 to 20 carbon atoms, or a metalloid of a Group 4 metal substituted with a hydrocarbyl; R1 and R2 or two R2s are optionally connected to each other by an alkylidene containing an alkyl having 1 to 20 carbon atoms or an aryl having 6 to 20 carbon atoms to form a ring;

R3, R3', and R3" are each independently hydrogen, a halogen, an alkyl having 1 to 20 carbon atoms, an alkenyl having 2 to 20 carbon atoms, an aryl having 6 to 20 carbon atoms, an alkylaryl having 7 to 20 carbon atoms, an arylalkyl having 7 to 20 carbon atoms, an alkoxy having 1 to 20 carbon atoms, an aryloxy having 6 to 20 carbon atoms, or a substituted or unsubstituted amino group; two or more of R3, R3', and R3" are optionally connected to each other to form an aliphatic or aromatic ring;

CY1 is a substituted or unsubstituted aliphatic or aromatic ring, in which CY1 is substituted with a halogen, an alkyl having 1 to 20 carbon atoms, an alkenyl having 2 to 20 carbon atoms, an aryl having 6 to 20 carbon atoms, an alkylaryl having 7 to 20 carbon atoms, an arylalkyl having 7 to 20 carbon atoms, an alkoxy having 1 to 20 carbon atoms, an aryloxy having 6 to 20 carbon atoms, or a substituted or unsubstituted amino group; and if CY1 is substituted with multiple substituents, two or more of the substituents are optionally connected to each other to form an aliphatic or aromatic ring;

M is a Group 4 transition metal;

Q1 and Q2 are each independently a halogen, an alkyl having 1 to 20 carbon atoms, an alkenyl having 2 to 20 carbon atoms, an aryl having 6 to 20 carbon atoms, an alkylaryl having 7 to 20 carbon atoms, an arylalkyl having 7 to 20 carbon atoms, a substituted or unsubstituted amino group, or an alkylidene having 1 to 20 carbon atoms,

[Formula 2]

wherein M2 is a Group 4 transition metal;

Cp and Cp' are each independently any one functional group selected from the group consisting of cyclopentadienyl, indenyl, 4,5,6,7-tetrahydro-1-indenyl, and fluorenyl, and they are optionally substituted with a hydrocarbon having 1 to 20 carbon atoms;

R4 and R5 are each independently hydrogen, an alkyl having 1 to 20 carbon atoms, an alkoxy having 1 to 10 carbon atoms, an aryl having 6 to 20 carbon atoms, an aryloxy having 6 to 10 carbon atoms, an alkenyl having 2 to 20 carbon atoms, an alkylaryl having 7 to 40 carbon atoms, an arylalkyl having 7 to 40 carbon atoms, an arylalkenyl having 8 to 40 carbon atoms, or an alkynyl having 2 to 10 carbon atoms;

Q3 is a halogen, an alkyl having 1 to 20 carbon atoms, an alkenyl having 2 to 10 carbon atoms, an alkylaryl having 7 to 40 carbon atoms, an arylalkyl having 7 to 40 carbon atoms, an aryl having 6 to 20 carbon atoms, a substituted or unsubstituted alkylidene having 1 to 20 carbon atoms, a substituted or unsubstituted amino group, an alkylalkoxy having 2 to 20 carbon atoms, or an arylalkoxy having 7 to 40 carbon atoms; and n is 1 or 0,

[Formula 3]

wherein M3 is a Group 4 transition metal;

R5 and R6 are each independently hydrogen, an alkyl having 1 to 20 carbon atoms, an alkenyl having 2 to 20 carbon atoms, an aryl having 6 to 20 carbon atoms, an alkylaryl having 7 to 40 carbon atoms, an arylalkyl having 7 to 40 carbon atoms, a silyl, a methoxymethyl, a t-butoxymethyl, a tetrahydropyranyl, a tetrahydrofuranyl, a 1-ethoxyethyl, a 1-methyl-1-methoxyethyl, or a t-butyl;

A is any one selected from the group consisting of an alkylene having 2 to 4 carbon atoms, an alkyl silicon or germanium having 1 to 4 carbon atoms, and an alkyl phosphine or an amine having 1 to 4 carbon atoms;

Q4 and Q5 are each independently a halogen, an alkyl having 1 to 20 carbon atoms, an alkenyl having 2 to 10 carbon atoms, an alkylaryl having 7 to 40 carbon atoms, an arylalkyl having 7 to 40 carbon atoms, an aryl having 6 to 20 carbon atoms, a substituted or unsubstituted alkylidene having 1 to 20 carbon atoms, a substituted or unsubstituted amino group, an alkylalkoxy having 2 to 20 carbon atoms, or an arylalkoxy having 7 to 40 carbon atoms, and m is an integer of 0 to 10,

[Formula 4]

wherein M4 is a Group 4 transition metal;

R7 and R8 are each independently an alkyl having 1 to 20 carbon atoms, an alkenyl having 2 to 20 carbon atoms, a cycloalkyl having 3 to 30 carbon atoms, an aryl having 6 to 30 carbon atoms, an alkylaryl having 7 to 30 carbon atoms, an arylalkyl having 7 to 30 carbon atoms, or an arylalkenyl having 8 to 30 carbon atoms;

Q6 and Q7 are each independently a halogen, an alkyl having 1 to 20 carbon atoms, an alkenyl having 2 to 20 carbon atoms, an aryl having 6 to 30 carbon atoms, an alkylaryl having 7 to 30 carbon atoms, or an arylalkyl having 7 to 30 carbon atoms, and Q6 and Q7 are optionally connected to each other to form a hydrocarbon ring having 1 to 20 carbon atoms;

B is an alkylene having 1 to 4 carbon atoms, a dialkyl silicon, germanium, an alkyl phosphine, or an amine, and acts as a bridge between two cyclopentadienyl ligands by a covalent bond;

a and a' are each independently a positive integer of 0 or more;

o is an integer of 0 to 2 and p is an integer of 0 to 3;

Y is a hetero atom of oxygen (O), sulfur (S), nitrogen (N), or phosphorus (P);

C is hydrogen or alkyl having 1 to 10 carbon atoms.

2. The method according to claim 1, wherein the mixed metallocene catalyst composition further comprises a cocatalyst.

3. The method according to claim 2, wherein the cocatalyst includes a compound of the following Formula 9:

[L-H]⁺[Z(E)₄]⁻          [Formula 9]

wherein L is a neutral Lewis base, [L-H]⁺ is a Bronsted acid, Z is boron or aluminum in a +3 oxidation state, and Es are each independently an aryl having 6 to 20 carbon atoms or an alkyl having 1 to 20 carbon atoms, in which one or more hydrogen atoms thereof are unsubstituted or substituted with a halogen, a hydrocarbyl having 1 to 20 carbon atoms, an alkoxy functional group, or a phenoxy functional group.

4. The method according to claim 1, wherein the mixed metallocene catalyst composition further comprises a scavenger.

5. The method according to claim 4, wherein the scavenger includes one or more selected from the group consisting of compounds of the following Formulae 10 and 11:

D(R9)₃          [Formula 10]

wherein D is aluminum or boron, and R9 is a hydrocarbyl having 1 to 20 carbon atoms, or a halogen-substituted hydrocarbyl having 1 to 20 carbon atoms,

[Formula 11]

wherein R10 is a halogen; a hydrocarbyl having 1 to 20 carbon atoms; or a halogen-substituted hydrocarbyl having 1 to 20 carbon atoms, and a is an integer of 2 or more.

6. The method according to claim 1, wherein the polymerization reaction of olefin monomers includes a solution polymerization reaction in a single reactor.

7. The method according to claim 1, wherein the olefin monomers include one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, and 3-chloromethylstyrene.

8. The method according to claim 1, wherein MFRR (melt flow rate ratio) of the prepared polyolefin satisfies the following Equation 1:

[MFRR (mixed metallocene catalyst)−MFRR (first metallocene catalyst)]/(mole ratio of second metallocene catalyst to mixed metallocene catalyst)>0.1,          [Equation 1]

wherein MFRR means MI10/MI2 as a ratio of melt index (MI) of a polyolefin measurable according to ASTM D-1238, MFRR (mixed metallocene catalyst) is MFRR of a polyolefin prepared by using the mixed metallocene catalyst composition, and MFRR (first metallocene catalyst) is MFRR of a polyolefin prepared by using the first metallocene catalyst alone.

* * * * *